(12) United States Patent
Bill et al.

(10) Patent No.: US 11,307,599 B2
(45) Date of Patent: Apr. 19, 2022

(54) DEVICE AND VALVE FOR FLOW FORCE COMPENSATION

(71) Applicant: HYDAC FLUIDTECHNIK GMBH, Sulzbach/Saar (DE)

(72) Inventors: Markus Bill, Eppelborn (DE); Frank Schulz, Blieskastel-Bierbach (DE)

(73) Assignee: HYDAC FLUIDTECHNIK GMBH, Sulzbach/Saar (DE)

(*) Notice: Subject to any disclaimer, the term of this patent is extended or adjusted under 35 U.S.C. 154(b) by 4 days.

(21) Appl. No.: 16/954,292

(22) PCT Filed: Dec. 17, 2018

(86) PCT No.: PCT/EP2018/085185
§ 371 (c)(1),
(2) Date: Jun. 16, 2020

(87) PCT Pub. No.: WO2019/121505
PCT Pub. Date: Jun. 27, 2019

(65) Prior Publication Data
US 2021/0089061 A1    Mar. 25, 2021

(30) Foreign Application Priority Data
Dec. 21, 2017 (DE) ..................... 10 2017 012 102.8

(51) Int. Cl.
*G05D 16/10* (2006.01)
*F16K 11/07* (2006.01)

(52) U.S. Cl.
CPC ........ *G05D 16/101* (2019.01); *F16K 11/0716* (2013.01)

(58) Field of Classification Search
CPC .. F16K 11/07; F16K 11/0716; F16K 11/0708; G05D 16/101
See application file for complete search history.

(56) References Cited

U.S. PATENT DOCUMENTS 3,324,890 A    6/1967 Whitmore et al.
4,313,467 A *  2/1982 Lang ................. B62D 5/08
                                               137/625.3
(Continued)

FOREIGN PATENT DOCUMENTS

DE    10 2014 004 796    10/2015
DE    10 2016 105 203     1/2017
WO    WO-2016178901 A1 * 11/2016 ........... F16K 15/183

OTHER PUBLICATIONS

International Search Report (ISR) dated Apr. 11, 2019 in International (PCT) Application No. PCT/EP2018/085185.

*Primary Examiner* — Daphne M Barry
(74) *Attorney, Agent, or Firm* — Wenderoth, Lind & Ponack, L.L.P.

(57) ABSTRACT

A device includes a regulating piston (12) guided longitudinally movably in a housing (10) and interacting with a control edge (56), at a pressure supply port (P) that supplies a utility port (A) in regulating positions of the regulating piston (12) with fluid. The pressure can be preset via a fluid connection, pulling the regulating piston towards a closed position blocking this fluid connection due to occurring flow forces. The regulating piston (12) has a change of shape (60) from its general outer basic shape in the area of the control edge (56) of the housing (10) for a flow force compensation. A flow contact surface for fluid is provided causing a compensating force acting against the flow force to be introduced into the regulating piston (12), which flow force pulls the regulating piston (12) into an open position opposite from the blocked position. The change of shape (60) also follows a step function, the function graph of which has at least one step more than the number of steps required to form the control edge (56).

13 Claims, 3 Drawing Sheets

(56) References Cited

U.S. PATENT DOCUMENTS

| | | | |
|---|---|---|---|
| 4,438,780 A * | 3/1984 | Chatterjea | B62D 11/08 137/596.14 |
| 4,941,508 A | 7/1990 | Hennessy et al. | |
| 6,142,171 A * | 11/2000 | Hancock | F16K 27/003 137/271 |
| 6,450,194 B1 * | 9/2002 | Wasson | F15B 13/0402 137/351 |
| 2003/0024581 A1 | 2/2003 | Nakamura et al. | |
| 2004/0000347 A1 * | 1/2004 | Shin | F16K 11/0708 137/625.69 |
| 2014/0137968 A1 * | 5/2014 | Hirano | F16K 27/041 137/625.48 |
| 2018/0080568 A1 * | 3/2018 | Bruck | F16K 31/0613 |
| 2018/0156345 A1 * | 6/2018 | Kanda | F16K 11/0716 |

\* cited by examiner

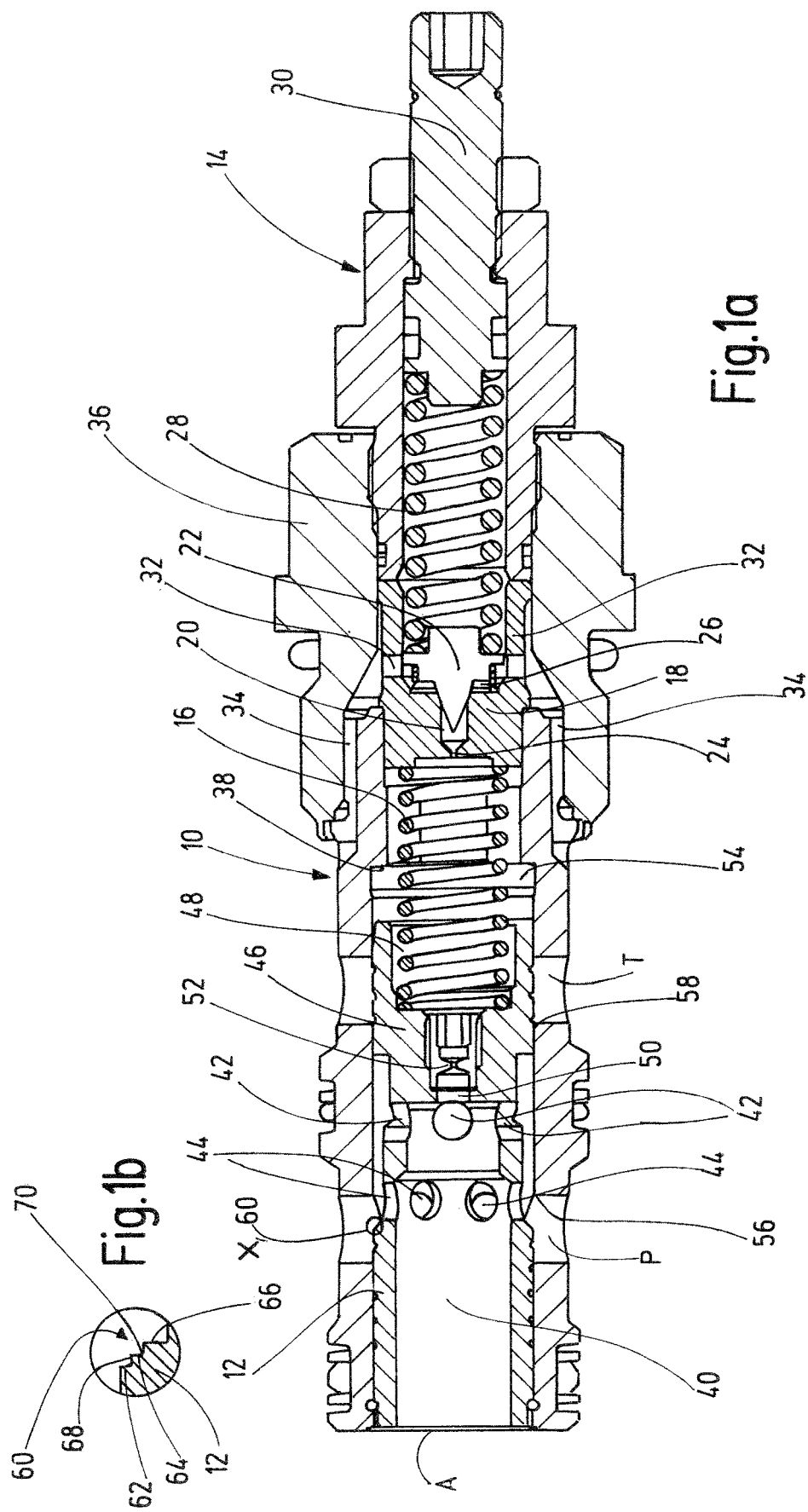

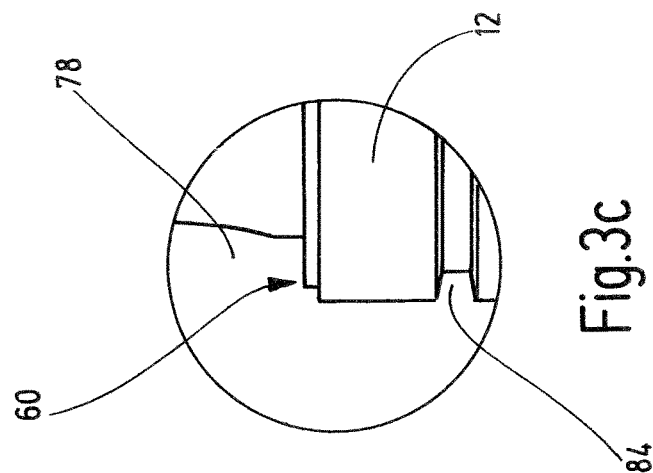
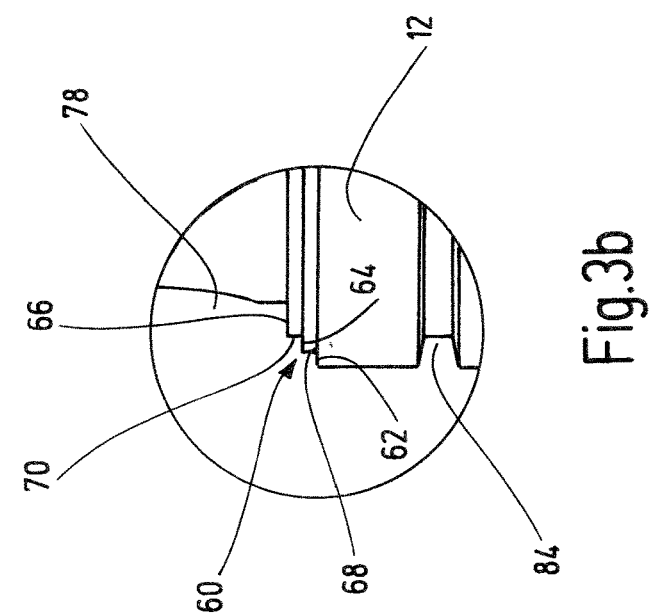
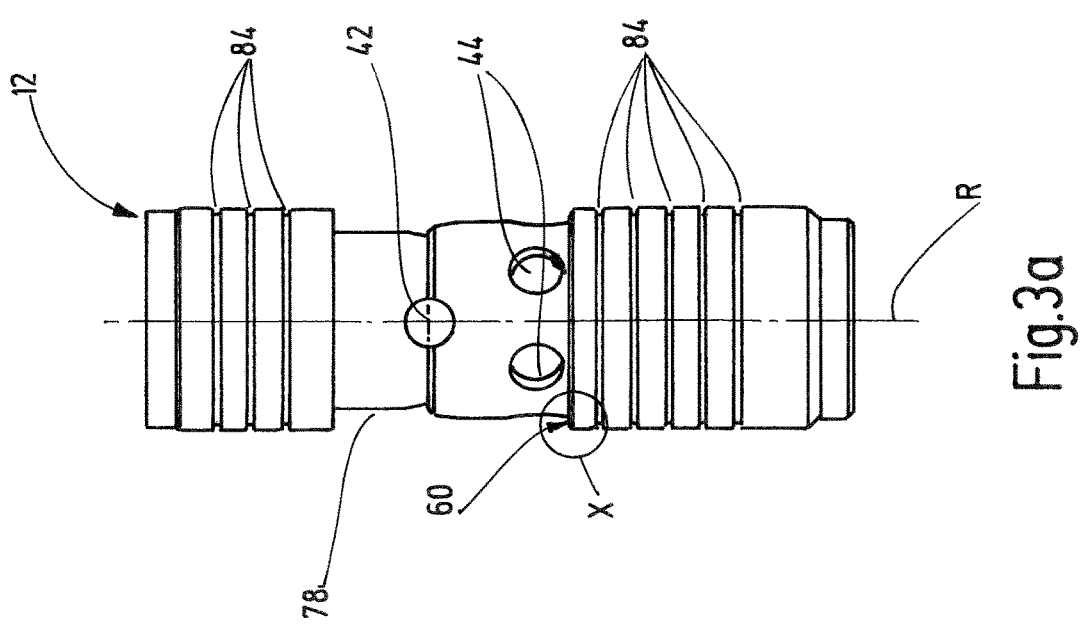

DEVICE AND VALVE FOR FLOW FORCE COMPENSATION

FIELD OF THE INVENTION

The invention relates to a device comprising at least one regulating piston, which is guided longitudinally movable in a housing having at least two ports for fluid. The piston interacts with a control edge, following a step function, of the housing at a pressure supply port. The pressure supply port supplies another port serving as utility port in regulating positions of the regulating piston with fluid. The pressure of the utility port can be preset, via a fluid connection and thereby aims at pulling towards a closed position blocking this fluid connection due to occurring flow forces. The regulating piston has a change of shape from its general outer basic shape in the area of the control edge of the housing for a flow force compensation. A flow contact surface for fluid is then provided, causing a compensating force acting against the flow force to be introduced into the regulating piston. The compensating force aims at pulling the regulating piston into an open position opposite from the blocked position.

BACKGROUND OF THE INVENTION

Such a device is used in a valve for supplying a hydraulic consumer, for instance, the clutch or brake of a vehicle, with a pressure, which can be preset. The hydraulic consumer to be supplied is connected to the utility port. The fluid connection between the pressure supply port and the utility port is opened by control movements of the regulating piston in accordance with the preset pressure. Fluid is routed from the pressure supply to the hydraulic consumer.

DE 10 2014 004 796 A1 discloses an exemplary proportional pressure control valve having a regulating piston guided longitudinally moveable in a valve housing. The regulating piston serves by an actuation system for the selective connection of the ports present in the valve housing, such as a pressure supply port, a consumer port and a tank port or a return port. The actuation system is formed in the manner of a solenoid system; but actuation by a pneumatic or other fluidic actuator or by a mechanical actuation system would also be feasible.

Flow forces act on the regulating piston of the device for the control process for supplying the hydraulic consumer, which forces are caused by the prevailing pressures and the volume flows to be controlled present at the ports. These flow forces are regularly caused by a pressure drop at the assignable control edge or regulating edge in the housing, for instance in the area from the pressure supply port to the utility port. This pressure drop creates a force in the direction of the actuation system connected to the device, which force attempts to move the regulating piston towards its closed position, thereby further reducing the set pressure.

A device of the type mentioned above for compensation of the undesirable flow forces by opening and closing of the control edges on a regulating piston, axially moveable in a valve housing, is known from DE 10 2016 105 203 A1. In the known device, a control groove for compensating flow forces, which reduces or eliminates the disturbance factors, has a flow force-compensated control edge geometry. Here, a shoulder-shaped compensation element is formed in the area of the control edge on the regulating piston. By the shoulder, an annular flow contact surface for fluid is created. With regard to improving the flow force compensation, the known solution still leaves a lot to be desired.

SUMMARY OF THE INVENTION

Starting from a device known from the state of the art, the invention addresses the problem of making the flow force compensation on the regulating piston even more effective and enabling an individual form of the flow force compensation in the area of the control edge.

A device having the features of the invention solves this problem. Advantageous features of the invention are disclosed.

In a device according to the invention, the change of shape also follows a step function. The function graph of the invention has at least one step more than the number of steps required to form the control edge. The flow contact surface is subdivided into at least two partial areas corresponding to the course of the step function. The fluid acting on the flow contact surface then causes an optimized introduction of force onto the regulating piston. As a result of the control edge following a step function and the change of shape also following a step function, a fluid space is created in the area. In that area, the regulating piston passes over the control edge in accordance with the control positions. In that fluid space the fluid can flow to act on the flow contact surface and flow past the control edge. According to the force formula $F=P \times A$, a counterforce to the flow force is generated during operation of the device, which counterforce attempts to pull the regulating piston into an open position opposite from the locked position. The form of the function graph of the step function, in particular the number and measurements of the individual steps, permits a flow force compensation meeting the demands at the change of shape specified by the function graph.

In a preferred embodiment of the device according to the invention, the respective step on the regulating piston forms an annular surface, which is concentric with the longitudinal axis of the regulating piston and perpendicular thereto. The annular surfaces can be formed in a simple manner on the regulating piston and enable a uniform force application along the entire circumference of the regulating piston. The individual annular surfaces form the flow contact surface for the fluid. Preferably, the shoulder surfaces connecting the annular surfaces to each other extend in parallel to the longitudinal axis of the regulating piston. However, it is also conceivable that the step function has a graph having surfaces arranged at an angle other than 90° to each other. For example, it is conceivable that the annular surfaces are inclined with respect to a vertical orientation.

In a further preferred embodiment of the device according to the invention, the individual, adjacent annular surfaces of the steps on the regulating piston are spaced apart from each other by shoulder surfaces, which are concentric with the longitudinal axis and parallel thereto. The step function on the regulating piston is then composed of a sequence of annular surfaces and shoulder surfaces. Shoulder surfaces extending in parallel to the longitudinal axis of the regulating piston permit the unhindered flow to the annular surfaces functioning as flow contact surfaces. However, it is also conceivable to form the shoulder surfaces on the regulating piston deviating from a parallel orientation, preferably having a slight inclination from a parallel orientation.

In a further preferred embodiment of the device according to the invention, the respective annular surface, viewed in the direction of the outer circumference of the regulating piston, is smaller than the respective inwardly adjoining annular surfaces. In this embodiment, the step function is not regularly formed, and the individual annular surfaces have different extensions in the radial direction. The extension of the individual ring surfaces in the radial direction decreases along the regulating piston from the inside to the outside, resulting in an improved flow force compensation, in that the fluid first acts on the annular surface having the greatest extension and then on annular surfaces having smaller extensions and is guided past the change of shape and the opposite control edge by the steps.

It is also advantageous that the respective shoulder surface in the direction of the outer circumference of the regulating piston, viewed in parallel to the longitudinal axis of the piston, has a smaller height than the innermost shoulder surface. Owing to the different heights of the shoulder surfaces, the annular surfaces have different distances from each other, viewed in the axial direction. Depending on the form of the step function, the annular surfaces have the same or different extension in the radial direction, and the shoulder surfaces have the same or different height, respectively extension in the axial direction, resulting in the change of shape defining the fluid space and the assigned flow force compensation on the regulating piston being formed according to the requirements.

In a further preferred embodiment of the device according to the invention, the function graph has more than two steps, and the shoulder surface arranged at the outermost on the regulating piston is followed by a shoulder surface of the same height for one step. This arrangement results in the advantage of a uniform arrangement and spacing of the annular surfaces serving for acting on by the fluid for flow force compensation.

Preferably, the innermost shoulder surface on the regulating piston merges into at least one fluid passage point in the regulating piston. When the control edge is reached, respectively, and is passed over, the associated fluid connection between the ports is opened or closed via the at least one fluid passage points. The direct transition from the respective fluid passage point to the shoulder surface as part of the change of shape prevents further possibly disturbing fluid flows and directly initiates the flow force compensation due to the fluid reaching the change of shape.

In a preferred embodiment of the device according to the invention, the step for forming the control edge at the pressure supply port is formed by a transition point between at least one associated fluid passage point in the housing and the inner wall of this housing, along which wall the regulating piston is guided in a movable manner. This transition has the advantage of achieving a counterforce to the actuating force acting on the regulating piston as flow force compensation when the fluid connection from the pressure source to the hydraulic consumer, respectively from the pressure supply port to the utility port, is actuated.

In a further preferred embodiment of the invention, in the closing direction of the regulating piston for closing the respective passage point with the control edge in its one direction of movement in this direction, the step sequence of the control edge and the regulating piston is ascending, viewed from the outside to the inside, and descending in the opposite direction of movement, viewed from the inside to the outside. The ascending or descending step sequence of the control edge and the regulating piston, depending on the direction of movement, is always the same, thus specifying a fluid space having essentially a uniform flow width. Particularly preferably, the step functions provided on the control edge and on the regulating piston have the same function graph, apart from the at least one further step formed on the regulating piston.

A further advantage is that the steps on the regulating piston merge into an internal recess on the outer circumference of the regulating piston, which recess merges out at the opposite end into a further step, which interacts with a control edge of a tank port. This merger provides flow force compensation when controlling the fluid connection between the utility port and the tank port. Advantageously, a fluid passage point is formed on the regulating piston in the area of the internal recess, which fluid passage point defines a fluid path to the utility port via a central recess.

In a preferred embodiment of the device according to the invention, the control edge at the tank port is formed by at least one assigned passage point in the valve housing. Preferably, the pressure supply port and the tank port are arranged radially on the outside of the valve housing, particularly preferably via passage points arranged in a circular and annular manner. The utility port is preferably formed at one axial end of the valve housing.

In another preferred embodiment of the device according to the invention, the length of the internal recess, viewed in parallel to the longitudinal axis of the regulating piston, corresponds to the direct distance between two adjacent control edges of the pressure supply port and the tank port. This length results in the advantage of opening and closing the fluid connections achievable by short control movements of the regulating piston. The internal recess formed on the regulating piston serves as part of the fluid connection between the tank port and the utility port, which fluid connection is controlled via the control edge.

Advantageously at least one further fluid passage point merges into the inner recess on the regulating piston, which fluid passage point is connected to the one at least one fluid passage point in the regulating piston via a central recess in the regulating piston in a fluid-conveying manner. Corresponding to the regulating position of the regulating piston, the fluid reaches the pressure supply port or the tank port via the central recess.

Further it is advantageous that an orifice device in the regulating piston is connected to the respective further fluid passage point. The orifice device connects the central recess of the regulating piston, and is permanently connected to the utility port in the valve housing in a fluid-conveying manner, to a further central recess in the regulating piston in a fluid-conveying manner. With the central recess a control device for the regulating piston engages at least in part. This arrangement results in the advantage of a compact structure of the regulating piston, with the fluid connections and the control device formed therein.

It is further advantageous that the outer diameter of the regulating piston is uniform outside the inner recess and the change of shape having the step function. The outer diameter is interrupted, preferably by inserted sealing strips and/or guide strips. The cylindrical regulating piston is guided in a cylindrical drilled hole in the housing longitudinally moveable and controls the ports formed in the housing.

The invention further relates to a valve, in particular a proportional pressure relief valve, which supplies a consumer with a predeterminable consumer pressure and preferably can be connected to a hydraulic drive system. The valve comprises a valve housing having at least two fluid connections, a device for the flow force compensation according to the invention and a control device for moving the regulating piston between the individual regulating positions. Preferably a pressure supply port and a tank port are radially incorporated into the valve housing, and a utility port is formed at the axial end of the valve housing. The device for flow force compensation ensures that the pressure specified for supplying the hydraulic consumer is maintained, without disturbing flow forces pulling the regulating piston into its blocking position.

The above-mentioned features and the further cited features can be implemented individually or in any combination in a device according to the invention and a valve according to the invention. Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are schematic and not to scale:

FIG. 1a is side view in section of a valve according to a first exemplary embodiment of the invention;

FIG. 1b is an enlarged partial side view in section of the form of the change of shape used for flow force compensation in the valve of FIG. 1a within circle X of FIG. 1a;

FIG. 2b is an enlarged partial side view in section of the form of a change of shape used for flow force compensation shown in the circle X of FIG. 2a;

FIG. 3a is a partial side view of a device according to a second exemplary embodiment of the invention for flow force compensation, shown for a regulating piston, as used in the valve according to FIG. 1a;

FIG. 3b is an enlarged partial side view of the form of a change of shape used for flow force compensation according to FIG. 3a in the circle X of FIG. 3a; and FIG. 3c is an enlarged side view of an alternative form of a change of shape used for flow force compensation, as used for a regulating piston according to FIG. 3a.

DETAILED DESCRIPTION OF THE INVENTION

Figure 2C:
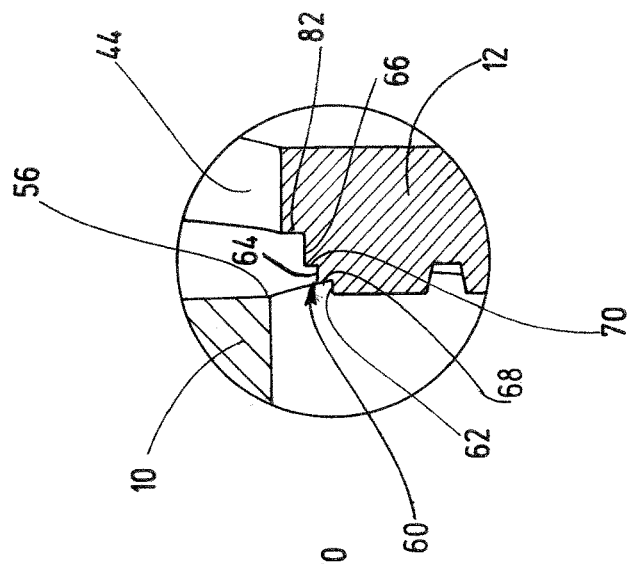
FIG. 2c is an enlarged partial side view in section of the form of an alternative embodiment of the change of shape used for flow force compensation similar to the solution according to FIG. 1b.

FIG. 1a shows a longitudinal section of a valve formed as a 3-way proportional pressure regulating valve having a regulating piston 12 longitudinally guided in a valve housing 10. The regulating piston 12, which has a valve pilot control 14, is used for the optional connection of ports formed in the valve housing 10, a pressure supply port P, a utility port A and a tank port T. The utility port A is incorporated into the valve housing 10 in the axial longitudinal direction at the left end, as viewed in the direction of FIG. 1a. The pressure supply port P and the tank port T are each incorporated radially into the valve housing 10 in the form of individual holes arranged in a circular and annular manner. The regulating piston 12 rests against a first compression spring 16, acting as an energy storage. In doing so, one free end of the first compression spring 16 rests against the piston 12, which has a hollow-drilled hole in this end. The other end of the first compression spring 16 rests against the recess of an orifice seat body 18. The orifice seat body 18, which is stationarily arranged in the valve body 10, has a longitudinal drilled hole 20, which forms a valve seat for a seat cone 22 at one end. A damping orifice 24 is provided at the opposite end. The seat cone 22 is clamped between a second compression spring 26 and a third compression spring 28 having different spring stiffnesses. The spring tension of the third compression spring 28 can be adjusted via a spindle drive 30. The seat cone 22 is lifted from the orifice seat body 18, forming its pilot seat, against the action of the third compression spring 28 caused by the pressure conditions in the valve. The lifting off is supported by the second compression spring 26. A fluid-conveying connection is then established from the damping orifice 24 via the pilot seat into transverse ducts 32 in the orifice seat body 18. The transverse ducts 32 merge into at least one longitudinal duct 34, which is routed to the tank port T. To form the individual longitudinal duct 34, the valve housing 10 is encompassed by a cartridge-shaped additional housing part 36. Depending on the pressure setting via the mechanical valve pilot control 14, in any case the pressure-limiting valve opens towards the tank port T, as soon as a presettable pressure threshold value is exceeded, to protect the hydraulic circuit, including the machines and equipment connected thereto, from damaging pressure peaks or a correspondingly damaging increase in pressure.

The utility port A is connected to the pressure supply port P in a fluid-conveying manner via the regulating piston 12 resting against the first pressure spring 16, as shown in FIG. 1a. When the regulating piston 12 moves in the longitudinal direction into at least one further regulating position, in which the regulating piston 12 moves in the direction of a stop 38 in the valve housing 10, utility port A is connected to the tank port T. For this purpose, the regulating piston 12 has a central recess 40, which extends from the end of the regulating piston 12 assigned to the utility port A, to the fluid passage points 42 arranged in an annular manner on the regulating piston 12. In the respective further regulating position of the regulating piston 12, the fluid passage points 42 serve to establish a fluid connection from the utility port A to the tank port T. Further fluid passage points 44, offset from the fluid passage points 42 in the direction of the utility port A, are formed on the regulating piston 12. Further fluid passage points 44 serve to establish the fluid connection from the utility port A to the pressure supply port P in the regulating position of the regulating piston 12, shown in FIG. 1a. A connecting part 46 and a further central recess 48, with which the first compression spring 16 engages, are adjoined to the central recess 40 of the regulating piston 12. A further longitudinal drilled hole 50 is incorporated in the connecting part 46 of the regulating piston 12. An orifice device 52 is inserted into the further longitudinal drilled hole 50, such that a fluid-conveying connection between the central recess 40, which adjoins the utility port A, and the further central recess 48, which adjoins an inner space 54 between the regulating piston 12 and the orifice seat body 18, is guaranteed in every movement position of the regulating piston 12.

To control the pressure supply port P, the regulating piston 12 passes over a control edge 56 formed on the valve body 10. To control the tank port T, the control piston 12 passes over another control edge 58, which is also formed on the valve body 10. In the area of the control edge 56 of the valve body 10, the regulating piston 12 has a change of shape 60 from its other outer basic shape, which is cylindrical in the embodiment shown. The form of the change of shape 60 in detail can be seen in FIG. 1b, which shows the area marked X in FIG. 1a in 10-fold magnification. The change of shape 60 follows a step function, whose function graph has three steps, and thus, two steps more than the single-step control edge 56. On the regulating piston 12, the steps form a first annular surface 62, a second annular surface 64 and a third annular surface 66, each of which extends concentrically to the longitudinal axis R (cf. FIG. 2a) of the regulating piston 12 and perpendicular thereto. The individual, adjacent annular surfaces 62, 64, 66 are spaced apart from one another by a first shoulder surface 68 and a second shoulder surface 70, which are concentric with the longitudinal axis R (cf. FIG. 2a) of the regulating piston 12 and extend parallel thereto. From the outer circumference of the regulating piston 12, the first annular surface 62 and the second annular surface 64 have approximately the same radial extension, whereas the third annular surface 66 has a greater radial extension. The two shoulder surfaces 68 and 70 are, viewed in the direction of the outer circumference of regulating piston 12, of approximately the same height. For this special form of the change of shape 60, the fluid for flow force compensation acts on the annular surfaces 62, 64, 66 with different radial extensions, thereby ensuring an optimized transmission of force to the regulating piston 12 and a good flow of fluid through the fluid space defined by the change of shape 60, past the control edge 56. Particularly preferably, the radial extension of the individual annular surfaces 62, 64, 66 is selected such that the annular surfaces 62, 64, 66 having different diameters each have the same surface area.

Figure 2B:
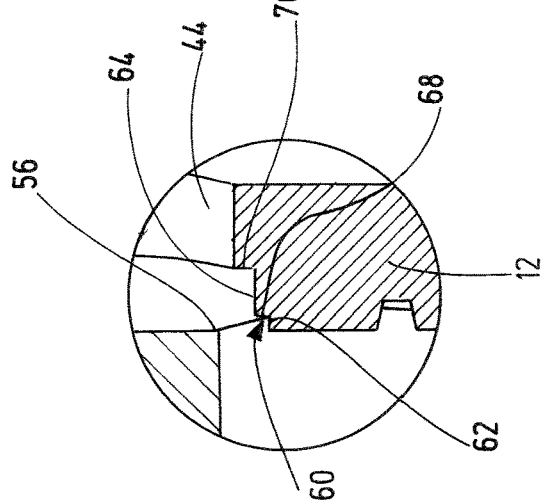
Figure 2A:
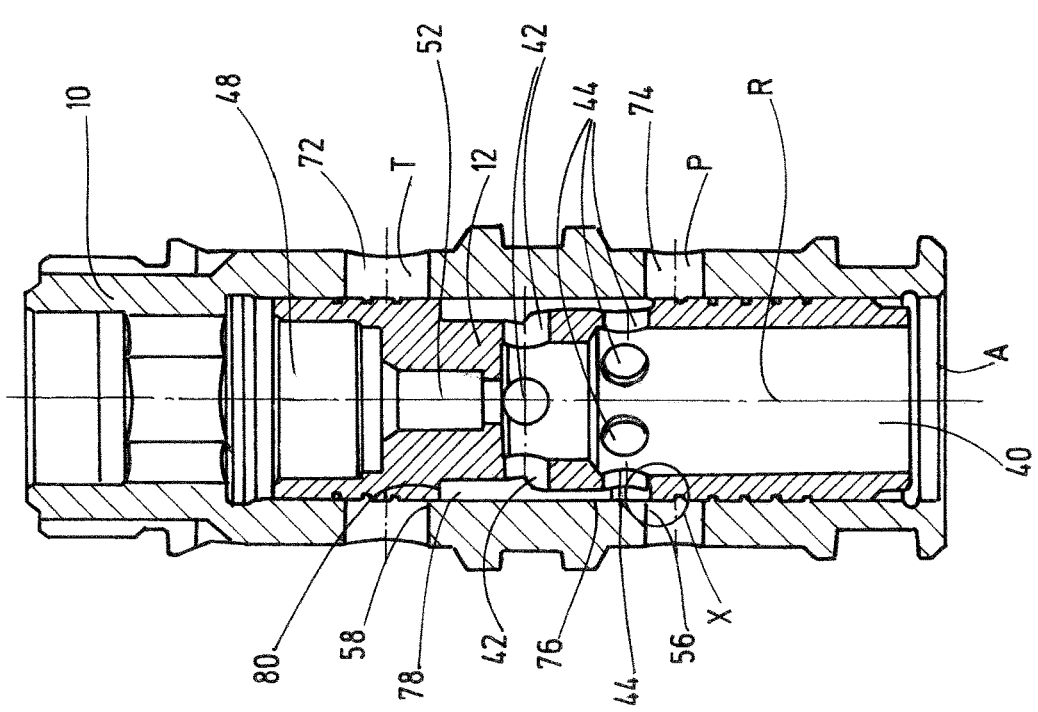
FIG. 2a is a side view in section of a part of a housing of the valve according to FIG. 1a having the device for flow force compensation according to the invention.

FIG. 2a shows a longitudinal section through a valve housing 10 of a device formed according to the invention, as it is a component of the valve according to FIG. 1a, with the regulating piston 12 longitudinally moveable in the housing 10. The valve housing 10 has a total of three ports for fluid, the utility port A axially introduced into the valve housing 10. The pressure supply port P is formed radially on the valve housing 10, as is the tank port T. The control edges 56, 58 of the pressure supply port P and the tank port T, respectively, are each formed by several radially incorporated passage points 72, 74 in the valve housing 10. The passage points 72 assigned to the tank port T are arranged along a circular annulus on the valve body 10, as are the further passage points 74 assigned to the pressure supply port P. The respective step for forming the control edge 56 at the pressure supply port P is formed by a transition point between the further passage points 74 in the valve body 10 and the inner wall 76 of the valve body 10, along which the regulating piston 12 is guided in a movable manner.

As the enlarged illustration of FIG. 2b shows, the control edge 56 is formed single stepped and the change of shape 60 on the regulating piston 12 is formed two stepped. The radially outer first annular surface 62 has a smaller extension in the radial direction than the adjacent second annular surface 64. The annular surfaces 62, 64, which are concentric with the longitudinal axis R of the regulating piston 12 and perpendicular thereto, are spaced apart from each other by a first shoulder surface 68, which is concentric with the longitudinal axis R and parallel thereto. To the second annular surface 64 adjoins the second shoulder surface 70, which merges into the further fluid passage point 44 in the regulating piston 12. When the regulating piston 12 passes over the control edge 56, the further fluid passage points 44 release the fluid connection from the pressure supply port P to the utility port A via the internal recess 78 of the regulating piston 12. Correspondingly, when the regulating piston 12 passes over the other control edge 58, the fluid connection from the utility port A to the tank port T is released via the central recess 40 and the fluid passage points 42, 44.

The steps of the change of shape 60 on the regulating piston 12 merge into an internal recess 78 of the regulating piston 12, which internal recess 78 is arranged radially opposite from the inner wall 76 of the valve body 10 and merges into a further step 80 at the axially opposite end, which further step 80 interacts with the further control edge 58 of the tank port T.

In the direction of the longitudinal axis R, the orifice device 52 in the regulating piston 12 is connected to the respective fluid passage point 42, which orifice device 52 is shown in FIG. 1a and not shown in FIG. 2a for reasons of simplicity, and connects the central recess 40 of the regulating piston 12, which is permanently connected to the utility port A in the valve housing 10 in a fluid-conveying manner, to the further central recess 48 in the regulating piston 12 in a fluid-conveying manner. A control device for the regulating piston 12 not shown in FIG. 2a engages with the further central recess 48 in the regulating piston 12. The actuation system is preferably part of a solenoid system, not shown; but actuation by a pneumatic or another fluidic actuator or a mechanical actuation system would also be feasible.

An alternative form of a change of shape 60 having three steps is shown in FIG. 2c. A first annular surface 62, a second annular surface 64 and a third annular surface 66 are spaced apart from each other by a first shoulder surface 68 and a second shoulder surface 70. A third shoulder surface 82 merges into the further fluid passage 44. The radially inner, third annular surface 66 has the greatest extension in the radial direction.

FIG. 3a shows a side view of the regulating piston 12, which is rotationally symmetrical to the longitudinal axis R, with the fluid passages 42, 44 formed in the regulating piston 12 and arranged in the area of the internal recess 78. In FIG. 3a it is clearly visible that the regulating piston 12 has the same outer diameter outside the inner recess 78 and the change of shape 60 arranged adjacent to the further fluid passage points 44 and with the step function. The outer diameter is interrupted by radially circumferential constrictions 84 representing pressure relief grooves. The regulating piston 12 is tapered at the end assigned to the utility port A, shown in FIG. 3a below. The constrictions 84 are formed at regular axial distances on the outer circumference of the regulating piston 12.

FIG. 3b shows the form of the change of shape 60 following a step function in detail. For the 3-stepped change of shape 60, the first annular surface 62, the first shoulder surface 68, the second annular surface 64 and the second shoulder surface 70 each have the same extension in the radial respectively axial direction. The third annular surface 66, viewed in the direction of the outer circumference of the regulating piston 12, is larger than the annular surfaces 62, 64, which adjoin towards the outside. In addition to the constriction 84 in the regulating piston 12, it can be further easily seen from the illustration in FIG. 3b that the regulating piston 12 has a slight curvature inside in the area of the inner recess 78 in the drawing, which results from the graphic representation when a drilled hole is incorporated at the location of a shoulder surface.

The alternative form of the change of shape 60 shown in FIG. 3c differs from the form shown in FIG. 3b in that one step, and thus, one annular surface and one shoulder surface fewer are provided. From the outer circumference of regulating piston 12, a first annular surface 62, a first shoulder surface 68 and a second annular surface 64 having a greater radial extension than the first annular surface 62 are then formed.

Different requirements for flow force compensation are due to different viscosities of the fluids used, the operating temperature and the pressures used as well as the form of the regulating piston 12, which is arranged in the valve body 10 in a movable manner. The different forms of the change of shape 60 on the regulating piston 12 shown in FIGS. 1b, 2b, 2c, 3b and 3c permit an optimized flow force compensation adapted to the respective control situations via the annular surfaces 62 to 66, which in conjunction form the flow contact surface for the fluid. When passing over the assigned control edge 56, a flow through space for fluid is formed in accordance with the step function that determines the change of shape 60. In the embodiments shown, the control edge 56 has a single step in each case, but step functions having more than one step at the control edge 56 are also conceivable. Due to different radial and axial extensions of the annular surfaces 62 to 66 and of the shoulder surfaces 68, 70, 82, different function graphs of the step function are specified. Besides a different action of the flowing fluid, a different flow behavior is achieved at the change of shape 60 and at the control edge 56.

While various embodiments have been chosen to illustrate the invention, it will be understood by those skilled in the art that various changes and modifications can be made therein without departing from the scope of the invention as defined in the claims.

The invention claimed is:

1. A device, comprising:
a housing having a pressure supply port and a utility port, the pressure supply port having a control edge; and
a regulating piston longitudinally movable in the housing and interacting with the control edge following a step function and controlling fluid flow from the pressure supply port to the utility port, the regulating piston having a change in a general outer basic shape of the regulating piston in an area of the control edge providing a flow compensation force via a flow contact surface acting against a flow force applied against the regulating piston in a closing direction toward a closed position tending to decrease the fluid flow from the pressure supply port to the utility port, the flow compensation force being applied to the regulating piston in an opening direction toward an open position tending to increase the fluid flow from the pressure supply port to the utility port, the step function having a function graph with first and second steps, the first and second steps on the regulating piston forming first and second annular surfaces extending about the regulating piston concentric with and perpendicular to a longitudinal axis of the regulating piston, the first and second annular surfaces being spaced apart from one another by first and second annular shoulder surfaces extending about the regulating piston, the first and second shoulder surfaces being concentric and parallel to the longitudinal axis;
the first and second steps on the regulating piston merging into an internal recess on an outer circumference of the regulating piston, the internal recess merging at an end thereof into a third step interacting with a tank control edge of a tank port in the housing;
a recess fluid passage point merging into the internal recess on the regulating piston connecting in fluid communication the internal recess to a first central recess in the regulating piston; and
a device orifice in the regulating piston being connected in fluid communication to the recess fluid passage point and to a second central recess in the regulating piston, the first central recess being permanently connected in fluid communication with the utility port, the second central recess engaging a control for the regulating piston.

2. A device according to claim 1 wherein
the first annular surface is radially outside the second annular surface, is smaller than or equal to the second annular surface and is adjacent to the second annular surface and is adjacent to the second annular surface.

3. A device according to claim 2 wherein
the first shoulder surface is radially outside the second shoulder and has a smaller height or an equal height than the second shoulder surface.

4. A device according to claim 1 wherein
the first shoulder surface is radially outside the second shoulder and has a smaller height or an equal height than the second shoulder surface.

5. A device according to claim 1 wherein
the function graph has the third step with a third shoulder arranged at a radially outermost part of the regulating piston and with an annular third shoulder surface of a same height as the first shoulder surface.

6. A device according to claim 1 wherein
the second shoulder surface merges into a piston fluid passage point in the regulating piston.

7. A device according to claim 1 wherein
a housing step forms the control edge and is formed by a transition point between an associated housing fluid passage point in the housing and an inner wall of the housing guiding longitudinal movement of the regulating piston.

8. A device according to claim 7 wherein
the regulating piston closes the housing fluid passage point in the direction of the closed position closing the housing fluid passage point with the control edge, a step sequence of the control edge and the change of shape on the regulating piston ascending when viewed from an outside to an inside and descending in an opposite direction when viewed from the inside to the outside.

9. A device according to claim 1 wherein
the tank control edge is formed by a passage point of the tank port in the housing.

10. A device according to claim 1 wherein
the internal recess has a length parallel to the longitudinal axis of the regulating piston corresponding to a direct distance between to a utility control edge of the utility port and a tank control edge that are adjacent one another.

11. A device according to claim 1 wherein
the regulating piston has a uniform outer diameter, except at the internal recess and the change of shape along the longitudinal axis and except for interruption by sealing and/or guide strips.

12. A device according to claim 1 wherein
the device comprises a proportional pressure relief valve capable of supplying a hydraulic consumer with a predeterminable hydraulic pressure.

13. A device, comprising:
a housing having a pressure supply port and a utility port, the pressure supply port having a control edge;
a regulating piston longitudinally movable in the housing and interacting with the control edge following a step function and controlling fluid flow from the pressure supply port to the utility port, the regulating piston having a change in a general outer basic shape of the regulating piston in an area of the control edge providing a flow compensation force via a flow contact surface acting against a flow force applied against the regulating piston in a closing direction toward a closed position tending to decrease the fluid flow from the pressure supply port to the utility port, the flow compensation force being applied to the regulating piston in an opening direction toward an open position tending to increase the fluid flow from the pressure supply port to the utility port, the step function having first and second steps;

an internal recess on an outer circumference of the regulating piston;

a recess fluid passage point merging into the internal recess on the regulating piston connecting in fluid communication to the internal recess to a first central recess in the regulating piston; and a device orifice in the regulating piston being connected in fluid communication to the recess fluid passage point and to a second central recess in the regulating piston, the first central recess being permanently connected in fluid communication with the utility port, the second central recess engaging a control for the regulating piston.

\* \* \* \* \*